(No Model.)
G. J. & E. CHAMBERS.
TAILOR'S MEASURE.
No. 332,783. Patented Dec. 22, 1885.
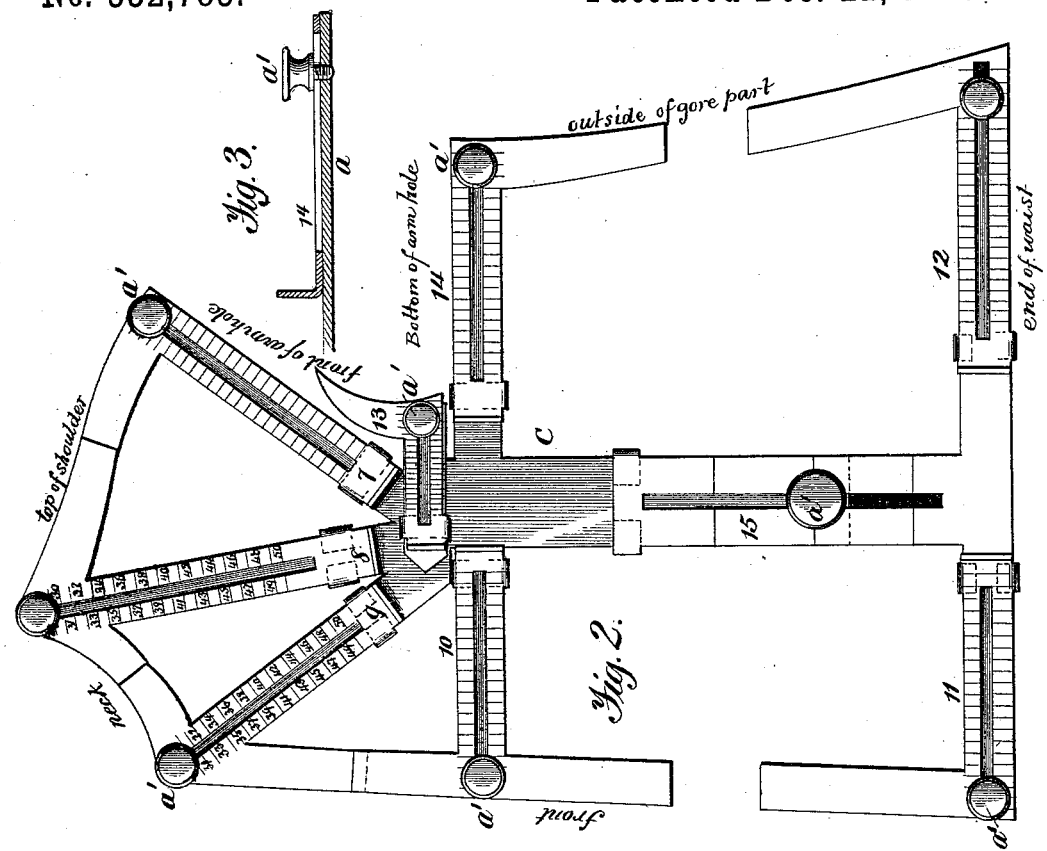
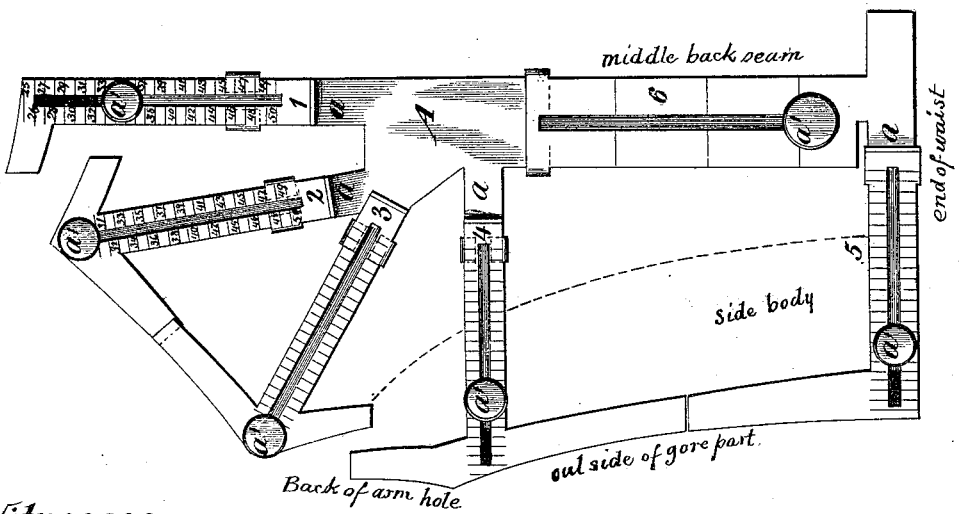
Witnesses.
A. Ruppert,
Alfred T. Gage.
Inventors.
G. J. Chambers
E. Chambers
Per
Thomas P. Simpson, Atty.

UNITED STATES PATENT OFFICE.

GEORGE J. CHAMBERS AND EDUARD CHAMBERS, OF SPRINGFIELD, ILL.

TAILOR'S MEASURE.

SPECIFICATION forming part of Letters Patent No. 332,783, dated December 22, 1885.

Application filed May 9, 1885. Serial No. 164,921. (No model.)

*To all whom it may concern:*

Be it known that we, GEORGE JOHN CHAMBERS and EDUARD CHAMBERS, of Springfield, in the county of Sangamon and State of Illinois, have invented an Improved Tailor's Measure, of which the following is a specification.

The special object of the invention is to furnish to the public such a tailor's measure as will be conveniently adapted for the drafting of garments intended for men, women, or children.

The invention will first be described in connection with the drawings, and then clearly pointed out in the claims.

Figures 1 and 2 of drawings represent in plan view the two measures which constitute my invention. Fig. 3 is a detail view in longitudinal section showing a slide on its arm and its screw-clamp.

In the drawings, A represents the body, and *a* the projecting arms. On the latter are holes, in which fit terminal stud-screws, and upon which fit the thumb or clamp nuts $a'$.

Numbers 1 2 3 4 5 6 represent the slides on body, as shown in Fig. 1 of the drawings, while numbers 7 8 9 10 11 12 13 14 15 the slides on body-frame. (Shown in Fig. 2.) Each one of these slides has a slot, which guides it on the stud-screw, while a keeper, passing around the arms *a*, prevents lateral displacement. The slides are provided with ends turned and so arranged that when all are set at the measured distance an outline will be obtained as near as possible to the required configuration of the part of garment to be drafted.

In order to use the measure, take a tape-line having a scale to correspond with that on slides and measure around the breast, close under the arms. Then, according to the measurement thus obtained, move out the correspondingly-scaled slides 1 2 3 4 5 in Fig. 1 of the drawings. Then measure with tape-line from neck down to waist, and move out slide 6 to correspond. Now place the measure A on the goods and mark with chalk around the arms of the slides, so as to give the proper outline. Then mark half-way between arms 3 4 and near slide 5, and connect the two points by a curved line, as shown in Fig. 1 of the drawings. This allows the back to be cut out with sufficiently approximate accuracy to make a proper fit. Now, on measure C move the slides 7 8 9 10 11 12 13 14 according to the breast-measure already taken with the tape-line, and move out slide 15 according to the tape-line measure from neck to the waist. Then place measure C on the goods. Now, you can proceed to cut out front and back, and the dimensions will correspond very closely with those of the individual who has been measured, no matter what may be the size or peculiarities of shape. With the tape-line measure across the waist, allowing one-fourth of an inch for each seam, and make darts to take out what is left over. It will thus be perceived that the slides, which are all scaled from 24 to 50, are governed by the two tape-line measurements, one around the breast and the other from neck to waist. These two, with a measurement around the waist, are all which are required in our system of drafting goods.

Having thus described all that is necessary to a full understanding of our invention, what we claim as new, and desire to protect by Letters Patent, is—

1. The measure A, having six scaled slides adapted to be used for drafting the back of a garment, in the manner set forth.

2. The scale C, having nine scaled slides adapted to be used for drafting the front of a garment, as specified.

GEORGE J. CHAMBERS.
EDUARD CHAMBERS.

Witnesses:
JAS. T. GRAHAM,
W. J. SMITH.

It is hereby certified that the name of one of the patentees in Letters Patent No. 332,783, granted December 22, 1885, for an improvement in "Tailors' Measures," was erroneously written and printed "Eduard Chambers," whereas said name should have been written and printed *Edward Chambers;* and that said Letters Patent should be read with this correction therein that the same may conform to the record of the case in the Patent Office.

Signed, countersigned, and sealed this 23d day of February, A. D. 1886.

[SEAL.]
                     H. L. MULDROW,
                    *Acting Secretary of the Interior.*

Countersigned:
  M. V. MONTGOMERY,
    *Commissioner of Patents.*